(12) United States Patent
Lassen et al.

(10) Patent No.: US 11,053,016 B1
(45) Date of Patent: Jul. 6, 2021

(54) AIRCRAFT MOVEMENT CONTROL SYSTEM

(71) Applicant: The Boeing Company, Chicago, IL (US)

(72) Inventors: Matthew August Lassen, Seattle, WA (US); Joseph E. Elliott, Seattle, WA (US); Stephen Todd Burrington, Seattle, WA (US); Robert James Myers, Mukilteo, WA (US); Kent E. Karnofski, Seattle, WA (US); Thomas Jenkins Staggs, Redmond, WA (US)

(73) Assignee: The Boeing Company, Chicago, IL (US)

( * ) Notice: Subject to any disclaimer, the term of this patent is extended or adjusted under 35 U.S.C. 154(b) by 313 days.

(21) Appl. No.: 16/259,231

(22) Filed: Jan. 28, 2019

(51) Int. Cl.
*B64C 31/04* (2006.01)
*B64D 31/04* (2006.01)
*B64C 13/04* (2006.01)
*B64C 13/14* (2006.01)
*G05G 5/08* (2006.01)
*G05G 1/04* (2006.01)

(52) U.S. Cl.
CPC .......... *B64D 31/04* (2013.01); *B64C 13/0425* (2018.01); *B64C 13/14* (2013.01); *G05G 1/04* (2013.01); *G05G 5/08* (2013.01); *G05G 2505/00* (2013.01); *G05G 2700/10* (2013.01); *G05G 2700/18* (2013.01)

(58) Field of Classification Search
CPC ..... B64D 31/04; B64C 13/04; B64C 13/0425; B64C 13/12
See application file for complete search history.

(56) References Cited

U.S. PATENT DOCUMENTS

| | | | | |
|---|---|---|---|---|
| 3,850,388 A | * | 11/1974 | Olcott | B64C 13/0425 244/221 |
| 4,489,907 A | * | 12/1984 | Ziegelmeyer | B64C 13/36 244/203 |
| 2013/0184900 A1 | * | 7/2013 | Constans | B64C 19/00 701/3 |
| 2016/0144948 A1 | * | 5/2016 | Sparks | B64C 13/04 74/519 |
| 2018/0297567 A1 | * | 10/2018 | Gonidec | B60T 8/171 |

* cited by examiner

*Primary Examiner* — Richard G Davis
(74) *Attorney, Agent, or Firm* — Yee & Associates, P.C.

(57) ABSTRACT

Controlling a movement of an aircraft. A computer system detects a position of a group of integrated control levers for the aircraft. The computer system controls a forward thrust, a drag, and a reverse thrust generated by the aircraft based on the position of the group of integrated control levers.

27 Claims, 12 Drawing Sheets

AIRCRAFT MOVEMENT CONTROL SYSTEM

BACKGROUND INFORMATION

1. Field

The present disclosure relates generally to aircraft and in particular, to a method, apparatus, and system for controlling movement of the aircraft.

2. Background

An aircraft, such as a large commercial jet, employs numerous control devices and displays that are used to control the movement of the aircraft on the ground and in the air. For example, a large commercial jet has physical control devices, such as thrust control levers used to manage the thrust from the aircraft engines and speed brake levers used to increase drag on the aircraft. These devices are examples of some control devices in the flight deck of the aircraft that are used by a pilot to control movement of the aircraft.

The number of different control devices in the aircraft can increase parameters such the weight, cost, and complexity of the aircraft. Further, the number of different control devices in the flight deck of an aircraft can make operating the aircraft more complex for a pilot than desired.

For example, more training may be needed than desired to properly operate the different control devices in the flight deck of the aircraft. Additionally, different types of aircraft may have different controls for the devices at different locations requiring additional training for a pilot to properly operate those different types of aircraft. As a result, pilots can be more limited in the types of aircraft that they can fly based on the training that they have completed.

Therefore, it would be desirable to have a method and apparatus that takes into account at least some of the issues discussed above, as well as other possible issues. For example, it would be desirable to have a method and apparatus that overcome a technical problem with the number of different control devices in the flight deck of an aircraft.

SUMMARY

An embodiment of the present disclosure provides an aircraft control system comprising a group of engines, speed brakes, a group of integrated control levers, a number of thrust reversers, and a computer system. The group of engines is operable to generate a forward thrust to move an aircraft during operation of the aircraft. The speed brakes are operable to generate a drag for the aircraft during operation of the aircraft. The group of integrated control levers are located in a flight deck of the aircraft, wherein the group of integrated control levers is moveable to different positions during operation of the aircraft. The number of thrust reversers in the group of engines is operable to generate a reverse thrust from the group of engines during operation of the aircraft. The computer system is located in the aircraft and controls the forward thrust generated by the group of engines, the drag generated by the speed brakes, and the reverse thrust generated by the number of thrust reversers in the group of engines based on a position of the group of integrated control levers in the different positions.

Another embodiment of the present disclosure provides an aircraft control system that comprises a computer system. The computer system is located in an aircraft. The computer system detects a position of a group of integrated control levers and controls a forward thrust, a drag, a reverse thrust generated by the aircraft based on the position of the group of integrated control levers.

Yet another embodiment of the present disclosure provides a method for controlling a movement of an aircraft. A position of a group of integrated control levers for the aircraft is detected by a computer system. A forward thrust, a drag, and a reverse thrust generated by the aircraft is controlled by the computer system based on the position of the group of integrated control levers.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it would be desirable to decrease the number of controls that a pilot uses to operate the aircraft. For example, the illustrative embodiments recognize and take into account that a control integrates the current thrust controller levers for generating engine thrust and speed brake levers for controlling drag is desirable to reduce the complexity of controls in an aircraft. Further, the illustrative embodiments recognize and take into account that this integration of controls can increase safety because a pilot does not have to remember to engage speed brake levers separately from manipulating the thrust controller during operation of an aircraft.

The illustrative embodiments recognize and take into account that an integrated control can also reduce the cost of aircraft. The illustrative embodiments recognize and take in account that part-reduction in cost-reduction can be achieved by integrating the control for thrust and speed brakes.

Thus, illustrative embodiments provide a method, apparatus, and system for controlling the movement of an aircraft. In one illustrative example, movement of an aircraft is controlled. A computer system detects a position of a group of integrated control levers for the aircraft. The computer system controls a forward thrust, a drag, and a reverse thrust generated by the aircraft based on the position of the group of integrated control levers. In this illustrative example, the integrated control levers integrate controls such as, for example, a thrust control lever and a speed brake lever.

Figure 1:
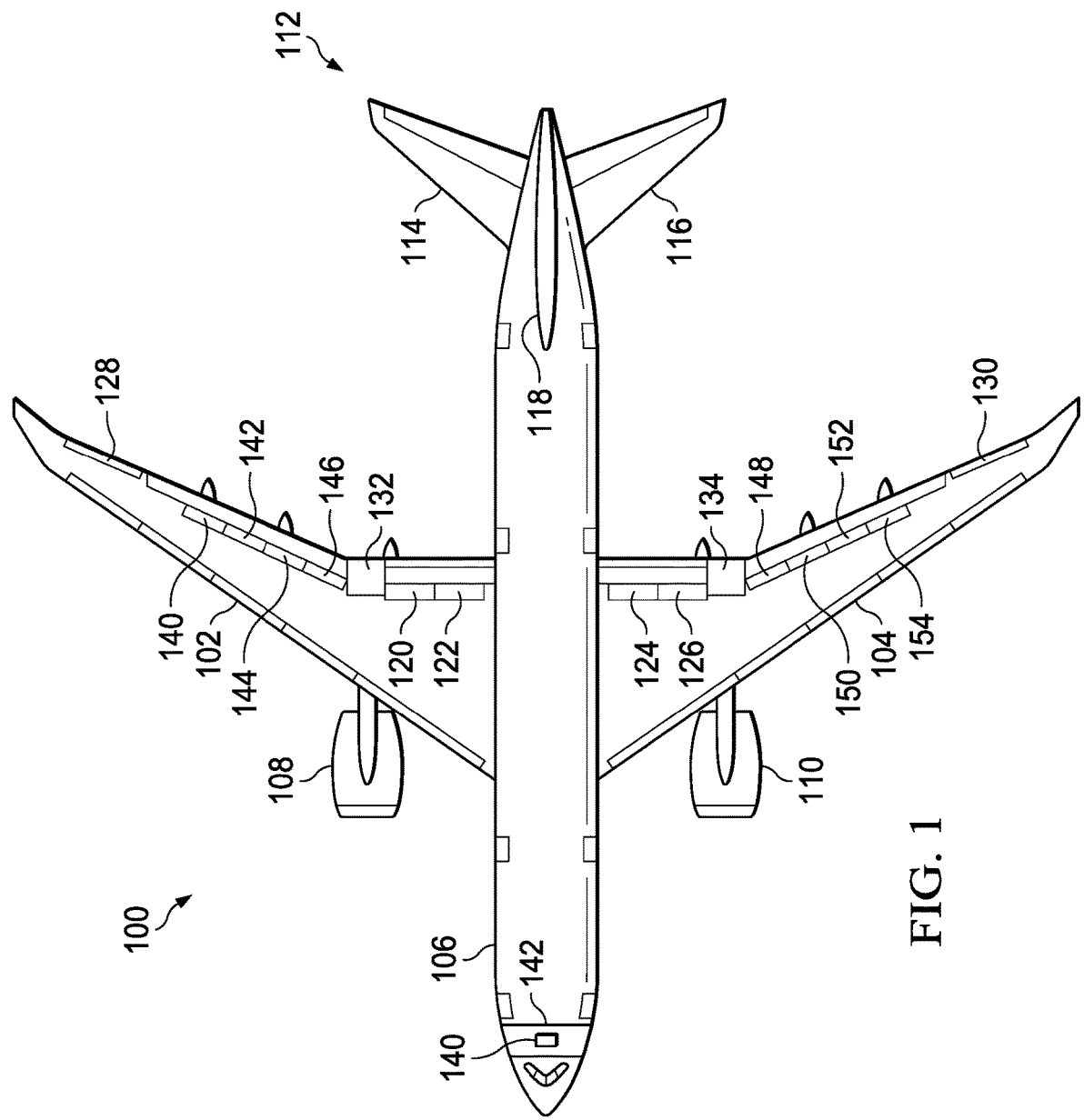
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104. Engine 108 and engine 110 operate to generate thrust for aircraft 100.

Body 106 has tail section 112. Horizontal stabilizer 114, horizontal stabilizer 116, and vertical stabilizer 118 are attached to tail section 112 of body 106.

Aircraft 100 is an example of an aircraft in which an aircraft control system can be implemented in accordance with an illustrative embodiment. At least one of spoiler 120, spoiler 122, spoiler 124, spoiler 126, spoiler 140, spoiler 142, spoiler 144, spoiler 146, spoiler 148, spoiler 150, spoiler 152, spoiler 154, aileron 128, aileron 130, flaperon 132, or flaperon 134 can be used as speed brakes to create drag for aircraft 100. The ailerons and flaperons are optionally used to create drag in the depicted example.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, and again without limitation, two of item A; one of item B; and ten of item C; four of item B and seven of item C; or other suitable combinations.

For example, flaperon 132 on wing 102 and flaperon 134 on wing 104 can be selected for use as speed brakes. In another example, flaperon 132 and spoiler 122 on wing 102 and flaperon 134 and spoiler 124 on wing 104 can be selected for use as speed brakes for aircraft 100. These and other combinations of control surfaces can be selected for use as speed brakes that a particular control surface on wing 102 has a corresponding control surface or mirrored control surface on wing 104.

These control surfaces and the engines for aircraft 100 both can be controlled using integrated controllers 140 in flight deck 142 of aircraft 100 during operation of aircraft 100 on the ground or in the air. The integrated controllers control the generation of thrust and drag in contrast to the current use of separate speed brake levers and thrust controllers.

Figure 2:
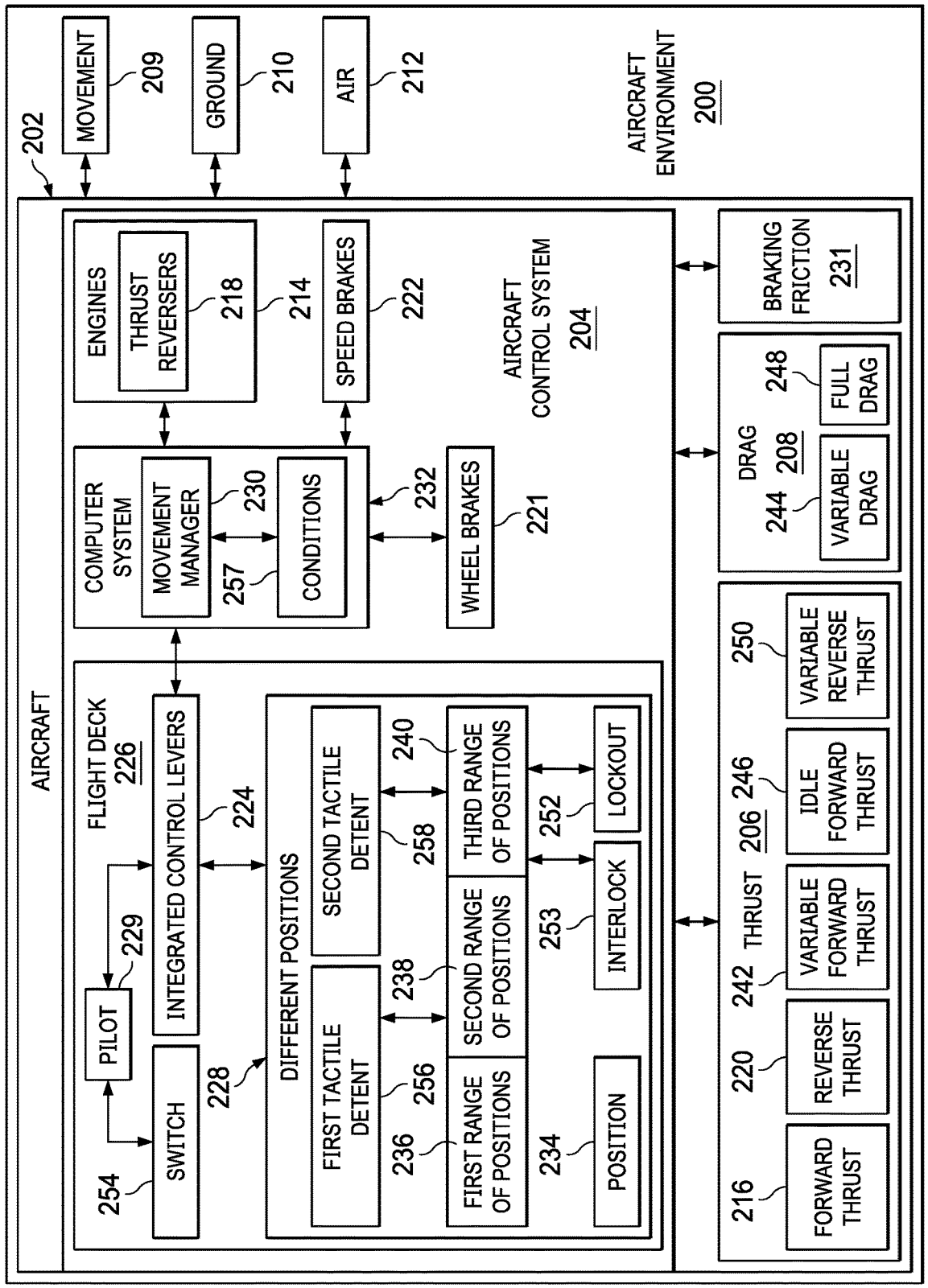
FIG. 2 is an illustration of a block diagram of an aircraft environment in the accordance with an illustrative embodiment.

With reference next to FIG. 2, an illustration of a block diagram of an aircraft environment is depicted in the accordance with an illustrative embodiment. Aircraft environment 200 is an environment in which aircraft 202 operates. Aircraft 100 in FIG. 1 is an example of one physical implementation for aircraft environment 200 shown in block form. In this illustrative example, aircraft 202 is selected from a group comprising an airplane, a jet, a passenger jet airplane, a military jet aircraft, a propeller airplane, an unmanned aerial vehicle, and a refueling tanker.

In this illustrative example, aircraft 202 includes aircraft control system 204. Aircraft control system 204 controls thrust 206 and drag 208 for aircraft 202. Aircraft control system is configured to control thrust 206 and drag 208 to control movement 209 of aircraft 202 both on ground 210 and in air 212.

As depicted, aircraft control system 204 in aircraft 202 includes a group of engines 214 that operate to generate forward thrust 216 to move aircraft 202 during operation of aircraft 202. Further, aircraft control system 204 also includes a number of thrust reversers 218 in the group of engines 214 that operate to generate reverse thrust 220 from the group of engines 214 during operation of aircraft 202.

As used herein, "a group of" when used with reference to items means one or more items. For example, a group of engines 214 is one or more of engines 214. In addition, "a number of" when used with reference items means one or more items. For example, a number of thrust reversers 218 is one or more of thrust reversers 218.

A number of thrust reversers 218 is located in a portion of the group of engines 214. The portion can be some or all of the group of engines 214. In this illustrative example, the number of thrust reversers 218 may be the same or fewer than the group of engines 214. In other words, some or all of engines 214 in the group of engines 214 can include a thrust reverser in thrust reversers 218. A thrust reverser can operate to generate a temporary diversion of forward thrust 216 generated by an engine of aircraft 202 that is directed in a forward direction with respect to aircraft 202 as reverse thrust 220.

As depicted, a thrust reverser in the number of thrust reversers 218 in the group of engines 214 can take a number of different forms. If the group of engines 214 include propeller blades, the propeller blades can be variable pitch propeller blades in which the pitch of the variable pitch propeller blades can be changed to generate reverse thrust 220.

When the group of engines 214 include jet engines, the thrust reversing devices can operate to block the jet blast from flowing in the backward direction as forward thrust 216 to a forward direction as reverse thrust 220. For example, thrust reverser can use a pair of hydraulically operated bucket type doors that reverse the jet blast. As another example, a clamshell door or cascade system can rotate to open ducts for the jet blast for reverse thrust 220 and close the normal exit of the jet blast from the engine for forward thrust 216.

In this illustrative example, aircraft control system 204 includes speed brakes 222 that are operable to generate drag 208 for aircraft 202 during operation of aircraft 202. Speed brakes 222 can be implemented using at least one of a control surface, a spoiler, a hydraulic tail cone clamshell air brake, a fuselage-mounted air brake, a deceleron, a rudder configured to vertically split, a wing leading edge device (e.g. leading edge slat), a flap, an air brake panel, or other suitable type of device that can operate to provide drag 208 for aircraft 202.

A control surface for use as a speed brake in speed brakes 222 can be selected from a group comprising a spoiler, an aileron, a flaperon, an air brake, a deceleron and other suitable types of control surfaces. A deceleron is also referred to as a split aileron and can split open to act as an air brake. For example, a portion of the aileron can move upward while a second portion of the element moves downward.

Additionally, aircraft control system 204 includes a group of integrated control levers 224 in flight deck 226 of aircraft 202. The group of integrated control levers 224 is moveable to different positions 228 by pilot 229 during operation of aircraft 202. In this illustrative example, the group of integrated control levers 224 is physical control levers.

The group of integrated control levers 224 can be at the same location in flight deck 226 as currently used thrust levers. The group of integrated control levers 224 can take the place of thrust levers and control thrust 206 and drag 208. Currently, each thrust lever controls thrust for an engine. In other words, a group of integrated control levers 224 can integrate additional functions in addition to controlling thrust as performed by currently used thrust control levers.

As depicted, aircraft control system 204 also includes movement manager 230 in computer system 232 located in the aircraft 202. Computer system 232 is a physical hardware system within aircraft 202 and includes one or more data processing systems. When more than one data processing system is present in computer system 232, those data processing systems are in communication with each other using a communications medium. The communications medium can be a network.

The data processing systems in computer system 232 can be selected from at least one of a computer, a server computer, a flight control surface system, an electronic flight bag, a tablet computer, or some other suitable data processing system. In the illustrative example, computer system 232 can be a group of flight control systems that generate commands for the group of engines 214, speed brakes 222, and the number of thrust reversers 218 in the group of engines 214 based on position 234 of the group of integrated control levers 224. In the illustrative example, the group of integrated control levers 224 are moved in the same direction by the same amount during normal operation of aircraft 202 such that all of integrated control levers 224 in the group of integrated control levers 224 in position 234 are in the same position.

In this illustrative example, movement manager 230 in computer system 232 detects position 234 of the group of integrated control levers 224. Movement manager 230 controls forward thrust 216, drag 208, and reverse thrust 220 generated by aircraft 202 based on position 234 of a group of integrated control levers 224. For example, movement manager 230 in computer system 232 controls forward thrust 216 generated by the group of engines 214, drag 208 generated by speed brakes 222, and reverse thrust 220 generated by the number of thrust reversers 218 in the group of engines 214 based on position 234 of the group of integrated control levers 224 in different positions 228.

In one illustrative example, different positions 228 are first range of positions 236, second range of positions 238 adjacent to first range of positions 236, and third range of positions 240 adjacent to second range of positions 238. Position 234 of integrated control levers 224 can be in any position within one of first range of positions 236, second range of positions 238, and third range of positions 240.

In this depicted example, movement manager 230 in computer system 232 controls the group of engines 214 to generate forward thrust 216 as variable forward thrust 242 without drag 208 from speed brakes 222 and without reverse thrust 220 from the number of thrust reversers 218 in the group of engines 214 based on position 234 of the group of integrated control levers 224 within first range of positions 236.

Further, movement manager 230 in computer system 232 controls speed brakes 222 to generate drag 208 as variable drag 244 with forward thrust 216 as idle forward thrust 246 from the group of engines 214 and without reverse thrust 220 from the number of thrust reversers 218 in the group of engines 214 based on position 234 of the group of integrated control levers 224 within second range of positions 238.

Additionally, movement manager 230 in computer system 232 controls speed brakes 222 to generate drag 208 as full drag 248 and the number of thrust reversers 218 in the group of engines 214 to generate reverse thrust 220 as variable reverse thrust 250 without forward thrust 216 from the group of engines 214 based on position 234 of the group of integrated control levers 224 within third range of positions 240.

In the illustrative example, lockout 252 can be present at the beginning of third range of positions 240. In this depicted example, lockout 252 is a physical lockout that prevents the group of integrated control levers 224 from moving into third range of positions 240. In this illustrative example, pilot 229 can perform a physical action such as operating switch 254 to remove lockout 252.

In the illustrative example, interlock 253 can be present within third range of positions 240. Once interlock 253 is reached within third range of positions 240, interlock 253 prevents the group of integrated control levers 224 from moving within third range of positions 240 until interlock 253 is removed. In other words, the group of integrated control levers 224 can move into third range of positions 240 but cannot move farther into third range of positions 240 until interlock 253 is removed. In this illustrative example, interlock 253 is to be an electronic control that is controlled by movement manager 230. Interlock 253 is present and can be removed when a group of conditions 257 are present. The group of conditions can be selected from at least one of aircraft 202 being on ground 210, the number of thrust reversers 218 is engaged, a selected altitude, a selected range of altitudes, a particular ground speed, a range of ground speeds, a range of air speeds, or other suitable conditions.

For example, interlock 253 can be removed when aircraft 200 is on ground 210. In another illustrative example, interlock 253 can be removed when aircraft 200 is on ground 210 and the number of thrust reversers 218 are engaged.

In the illustrative example, lockout 252 and interlock 253 can be present. When both of these controls are present, removal of interlock 253 removes the electronic control that prevents movement of the group of integrated control levers 224. However, the group of integrated control levers 224 may not move until lockout 252 is also removed through a definite action of pilot 229, such as manipulating switch 254.

Further, first tactile detent 256 can be present for second range of positions 238 and second tactile detent 258 can be present for third range of positions 240. First tactile detent 256 can be used to indicate that second range of positions 238 has been reached. Second tactile detent 258 can indicate that third range of positions 240 has been entered.

In this illustrative example, first tactile detent 256 delineates the boundary between first range of positions 236 and second of positions 238. Second tactile detent 258 is located in third range of positions 240. In this example, at least one of lockout 252 delineates the boundary between second range of positions 238 and third range of positions 240. In other words, second tactile detent 258 is not felt by pilot 229 until at least one of interlock 253 or lockout 252 has been cleared.

In other illustrative examples, these tactile detents can be located as the respective range of positions are entered or reached. In other illustrative examples, the tactile detents can be located after the range of positions has been entered. These tactile detents can be an increase in friction or tactile feedback. For example, tactile feedback could be a vibration that is sent through the group of integrated control levers 224.

In another illustrative example, different positions 228 are first range of positions 236 and second range of positions 238 adjacent to first range of positions 236. With this illustrative example, movement manager 230 in computer system 232 controls the group of engines 214 to generate forward thrust 216 as variable forward thrust 242 without drag 208 from speed brakes 222 and without reverse thrust 220 from the number of thrust reversers 218 in the group of engines 214 based on position 234 of the group of integrated control levers 224 within first range of positions 236.

Further, movement manager 230 in computer system 232 controls speed brakes 222 to generate drag 208 as variable drag 244 and the group of engines 214 to generate forward thrust 216 as idle forward thrust 246 without reverse thrust 220 from the number of thrust reversers 218 in the group of engines 214 based on position 234 of the group of integrated control levers within second range of positions 238 when aircraft 202 is in air 212.

Additionally, movement manager 230 in computer system 232 controls speed brakes 222 to generate drag 208 as full drag 248 and the number of thrust reversers 218 in the group of engines 214 to generate reverse thrust 220 as variable reverse thrust 250 without forward thrust 216 from the group of engines 214 based on position 234 of the group of integrated control levers 224 within second range of positions 238 when aircraft 202 is on ground 210. In this particular example, first tactile detent 256 can present for entering second range of positions 238.

Movement manager 230 can be implemented in software, hardware, firmware or a combination thereof. When software is used, the operations performed by movement manager 230 can be implemented in program code configured to run on hardware, such as a processor unit. When firmware is used, the operations performed by movement manager 230 can be implemented in program code and data and stored in persistent memory to run on a processor unit. When hardware is employed, the hardware can include circuits that operate to perform the operations in movement manager 230.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In one illustrative example, one or more technical solutions are present that overcome a technical problem with the increased complexity involved with multiple devices used to control the movements of an aircraft. As a result, one or more technical solutions can provide a technical effect reducing the complexity in performing operations to control movement of an aircraft. One or more technical solutions can provide a technical effect of reducing the complexity through combining functions currently performed using multiple control devices into a single set or group of control devices.

Computer system 232 can be configured to perform at least one of the steps, operations, or actions described in the different illustrative examples using software, hardware, firmware or a combination thereof. As a result, computer system 232 operates as a special purpose computer system in which computer system 232 enables reducing complexity in controlling the movements of an aircraft. In particular, movement manager 230 transforms computer system 232 into a special purpose computer system as compared to currently available general computer systems that do not have movement manager 230.

With this control of thrust 206, drag 208, and reverse thrust 220, enhanced safety can be achieved in operating aircraft 202. As depicted, aircraft control system 204 manages when thrust 206, drag 208, and reverse thrust 220 can be generated by aircraft 202. For example, drag 208 is undesirable when forward thrust forward thrust 216 is being generated. This situation is inherently impossible with pilot operating aircraft 202 using the group of integrated control levers 224 since forward thrust 216 will be reduced to idle before the group of integrated control levers 224 enters third range of positions 240 to begin commanding non-zero drag.

As another illustrative example, the control of thrust 206, drag 208, and reverse thrust 220 by movement manager 230 can be based on altitude of, rather than whether, aircraft is on ground 210 or in air 212.

Figure 3:
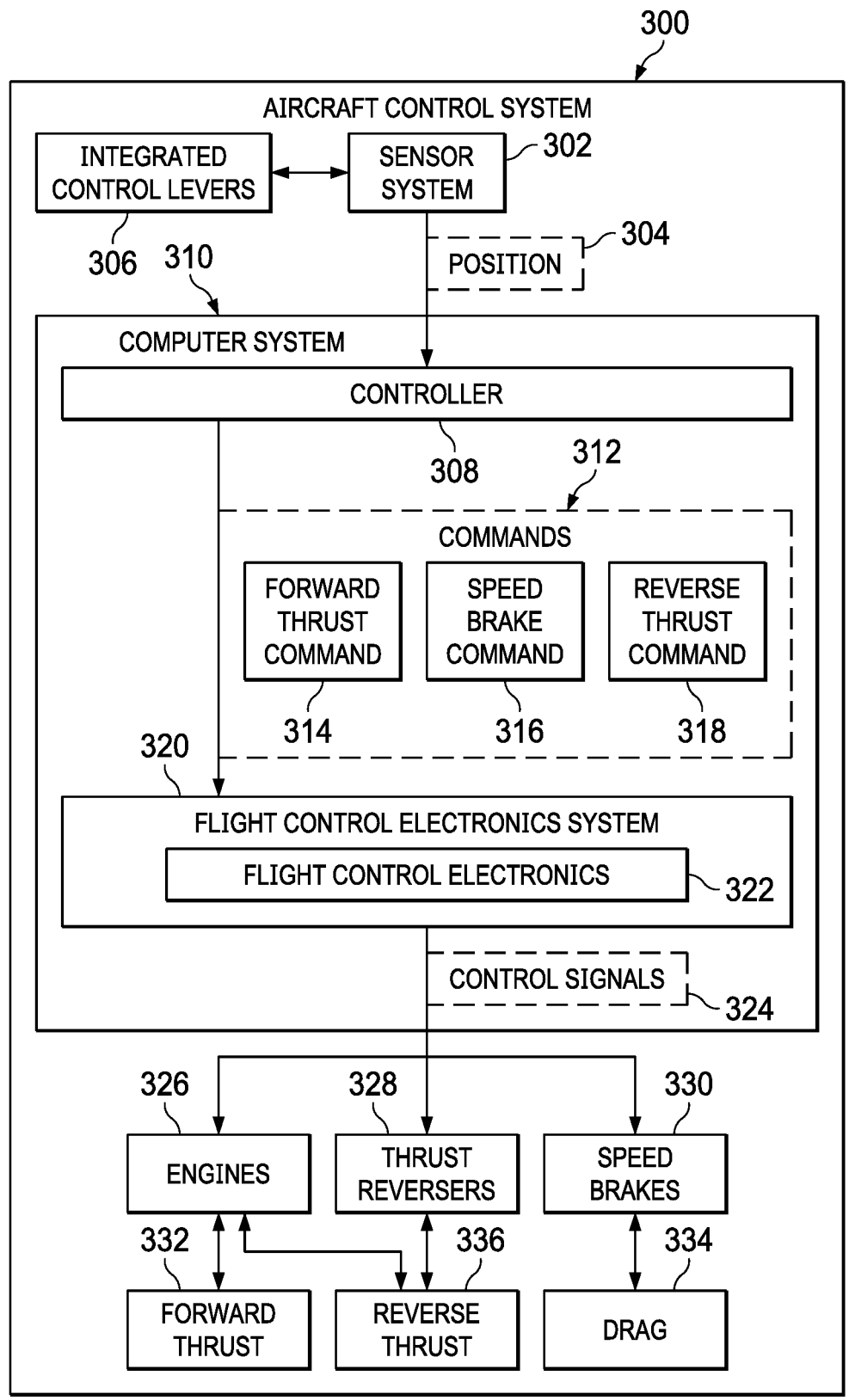
FIG. 3 is an illustration of a block diagram of an aircraft control system in accordance with an illustrative embodiment.

With reference next to FIG. 3 an illustration of a block diagram of an aircraft control system is depicted in accordance with an illustrative embodiment. This figure is an example of one implementation of aircraft control system 204 used to control the movement of aircraft 202 in FIG. 2.

As depicted, aircraft control system 300 includes sensor system 302 which is a physical system that detects position 304 of integrated control levers 306. Controller 308 is at least one of a software component or a hardware component within computer system 310. Controller 308 generates commands 312 based on position 304 of integrated control levers 306. Commands 312 can include at least one of forward thrust command 314, speed brake command 316, or reverse thrust command 318. In this illustrative example, forward thrust command 314 can include idle forward thrust, which is sufficient to provide power to run the aircraft but insufficient to cause forward motion. Controller 308 is an example of one implementation for movement manager 230 shown in block form in FIG. 2.

Commands 312 are sent to flight control electronics system 320 in computer system 310. In this illustrative example, flight control electronics system 320 includes a plurality of flight control electronics 322. Multiple flight control electronics are present in flight control electronics system 320 to provide for redundancy or error correction. Commands 312 can be sent using a communications medium, such as an Aeronautical Radio Inc (ARINC) 429 bus, in computer system 310.

As depicted, flight control electronics system 320 generates control signals 324 in response to receiving commands 312 from controller 308. Control signals 324 are sent to engines 326, thrust reversers 328, and speed brakes 330 in a manner that controls forward thrust 332 generated by engines 326, drag 334 generated by speed brakes 330, and reverse thrust 336 generated by thrust reversers 328. These control signals can control components including at least one of a valve, an actuator, a solenoid, or other suitable component that can be used to manage the operation of engines 326, thrust reversers 328, and speed brakes 330.

The manner in which these components are controlled depend on position 304 within ranges of positions for integrated control levers 306. The commands generated can be used to control engines 326, thrust reversers 328, the speed brakes 330 in a manner similar to how engines 214, thrust reversers 218, and speed brakes 222 are controlled in FIG. 2 using at least one of first range of positions 236, second range of positions 238, and third range of positions 240 in FIG. 2.

The illustration of the different components in aircraft environment 200 used to control aircraft 202 in FIG. 2 and FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, the group of engines 214, the number of thrust reversers 218, and speed brakes 222 can be considered components outside of aircraft control system 204 in other implementations. In yet another illustrative example, movement manager 230 can also control the coordination in the movement of integrated control levers 224. As another illustrative example, movement manager 230 can limit the amount of thrust differential that can be generated through moving the group of integrated control levers 224 to different positions. This depicted example assumes that all of the levers in the group of integrated control levers 224 are moved to the same positions during normal operation of aircraft 202.

In another yet illustrative example, other number of ranges of positions can be used in addition to or in place of two or three ranges of positions. For example, a single range of positions can be used. In another example, four ranges of positions can be used. Four ranges of positions can be implemented with a propeller driven airplane. In this example, the fourth range of positions can be present between a second and third range of positions. For example, the fourth range of positions can be located between lockout 252 and second tactile detent 258.

This fourth range of positions may be useful to provide direct control of propeller pitch below the lowest pitch allowed by the propeller governor, but not reverse pitch, which would be the remaining region beyond the tactile detent. This control can provide additional deceleration, beyond that provided by speed brakes.

In yet another illustrative example, aircraft control system 204 can also include wheel brakes 221 for the landing gear of aircraft 202. As depicted, wheel brakes 221 can provide braking friction 231, which also serves to slow down aircraft 202 in addition to using reverse thrust 220 and drag 208.

Wheel brakes 221 can also be operated based position 234 of the group of integrated control levers 224. For example, wheel brakes 221 can be activated with a variable amount of breaking during third range of positions 240. In another illustrative example, wheel brakes 221 can be activated, in addition to speed brakes 222 and the thrust reversers 218, in the fourth range of positions by the group of integrated control levers 224. With a single range of positions, tactile detents are not present to indicate to pilot 229 which function is being controlled. single range of positions control a continuum from maximum acceleration to maximum deceleration. Movement manager 230 in computer system 232 determines where and when to ramp down forward thrust 216, deploy speed brakes 222, deploy thrust reversers 218, and ramp up reverse thrust 220.

With reference to FIGS. 4-9, illustrations of positions for a group of integrated control levers is depicted in accordance with an illustrative embodiment. These figures show the different positions that can be present for a group of integrated control levers and are used to describe the thrust and drag generated by the aircraft. As depicted, FIGS. 4-9 show three ranges of positions that a group of integrated control levers can be placed to control movement of an aircraft.

Figure 4:
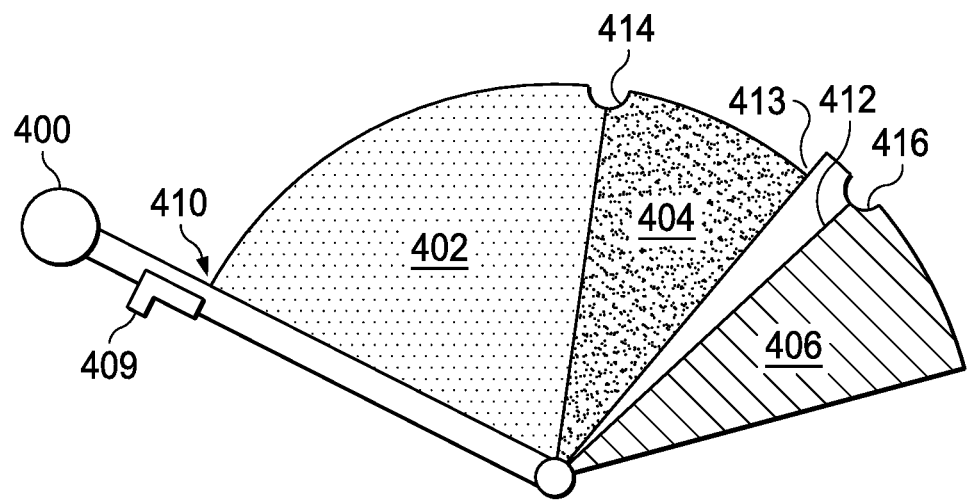
FIG. 4 is an illustration of multiple ranges of positions for integrated control levers in accordance with an illustrative embodiment.

With reference first to FIG. 4, an illustration of multiple ranges of positions for integrated control levers is depicted in accordance with an illustrative embodiment. As depicted, integrated control levers 400 are shown with respect to first range of positions 402, second range of positions 404, and third range of positions 406.

Integrated control levers 400 are an example of the group of integrated control levers 224 shown in block form in FIG. 2. First range of positions 402, second range of positions 404, and third range of positions 406 are an example of first range of positions 236, second range of positions 238, and third range of positions 240 shown in block form in FIG. 2.

In this illustrative example, second range of positions 404 is adjacent to first range of positions 402. Second range of positions 404 is also adjacent to third range of positions 406 such that second range of positions 404 is located between first range of positions 402 and third range of positions 406.

Further, interlock 412 is located near the beginning of the third range of positions 406 and is an example of one implementation for interlock 253 shown in block form in FIG. 2. Interlock 412 prevents integrated control levers 400 from moving further into third range of positions 406 when interlock 412 is active.

Further, lockout 413 can also be present. Lockout 413 can be a physical locking mechanism that prevents movement of integrated control levers into third range of positions 406. With this example, lockout 413 can be removed by a pilot manipulating switch 409. In this example, lockout 413 is a lockout mechanism controllable by a pilot while interlock 412 is a mechanism controllable by a movement manager, such as movement manager 230 from FIG. 2.

First tactile detent 414 is located between first range of positions 402 and second range of positions 404 and second tactile detent 416 is located within third range of positions 406. First tactile detent 414 is an example of an implementation of first tactile detent 256 shown in block form in FIG. 2. Second tactile detent 416 is an example of an implementation of second tactile detent 258 shown in block form in FIG. 2.

The aircraft generates a forward thrust as a variable thrust without a drag and without a reverse thrust when integrated control levers 400 are within the first range of positions 402. As depicted, integrated control levers are in position 410 within first range of positions 402.

In this illustrative example, the forward thrust is a variable forward thrust in which the forward thrust changes as the position of integrated control levers 400 changes within first range of positions 402.

The variable forward thrust increases as integrated control levers 400 move to the left within the first range of positions 402. The variable forward thrust decreases as integrated control levers 400 move to the right within the first range of positions 402.

Figure 5:
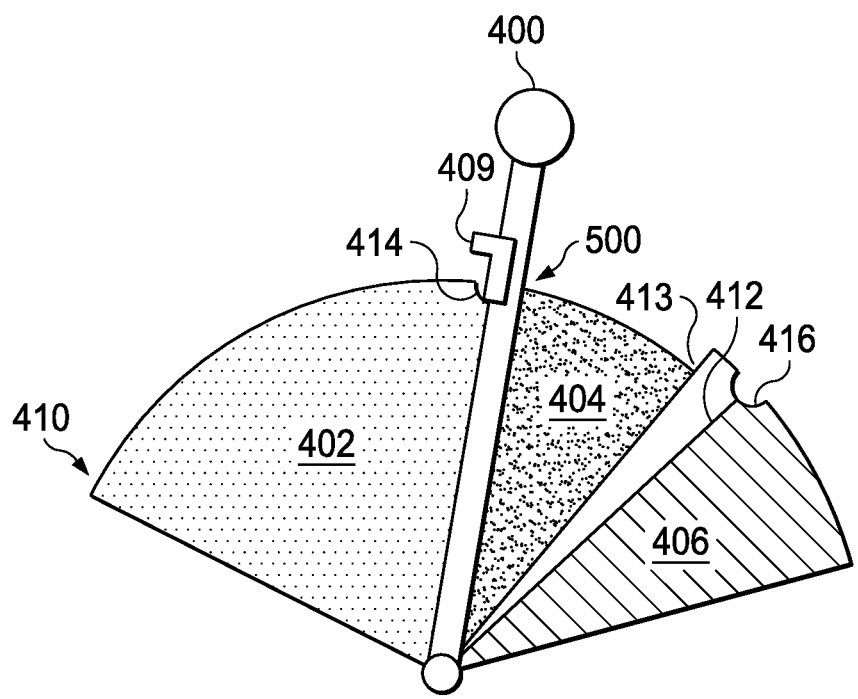
FIG. 5 is an illustration of integrated control levers within a first range of positions in accordance with an illustrative embodiment.

With reference next to FIG. 5, an illustration of integrated control levers within a first range of positions is depicted in accordance with an illustrative embodiment. In this illustrative example, integrated control levers 400 are in position 500 between first range of positions 402 and second range of positions 404. Integrated control levers have moved to the right of position 410.

In position 500, the aircraft generates the idle forward thrust without the drag and without the reverse thrust. In position 500, the aircraft generates idle forward thrust that is less than the variable forward thrust generated when integrated control levers are in position 410.

Figure 6:
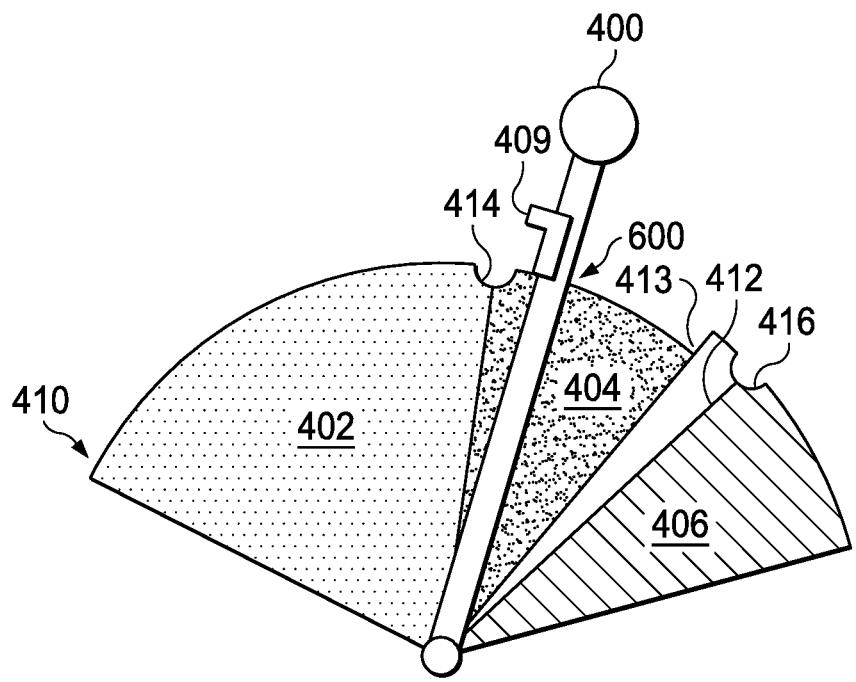
FIG. 6 is an illustration of integrated control levers within a second range of positions in accordance with an illustrative embodiment.

With reference to FIG. 6, an illustration of integrated control levers within a second range of positions is depicted in accordance with an illustrative embodiment. In this illustrative example, the aircraft generates a forward thrust as an idle forward thrust and a drag as a variable drag without a reverse thrust when integrated control levers are within second range of positions 404.

Integrated control levers 400 are in position 600 within second range of positions 404. The drag is a variable drag in which the drag increases as integrated control levers 400 move to the right within second range of positions 404 and the drag decreases when integrated control levers 400 move to the left within second range of positions 404.

Figure 7:
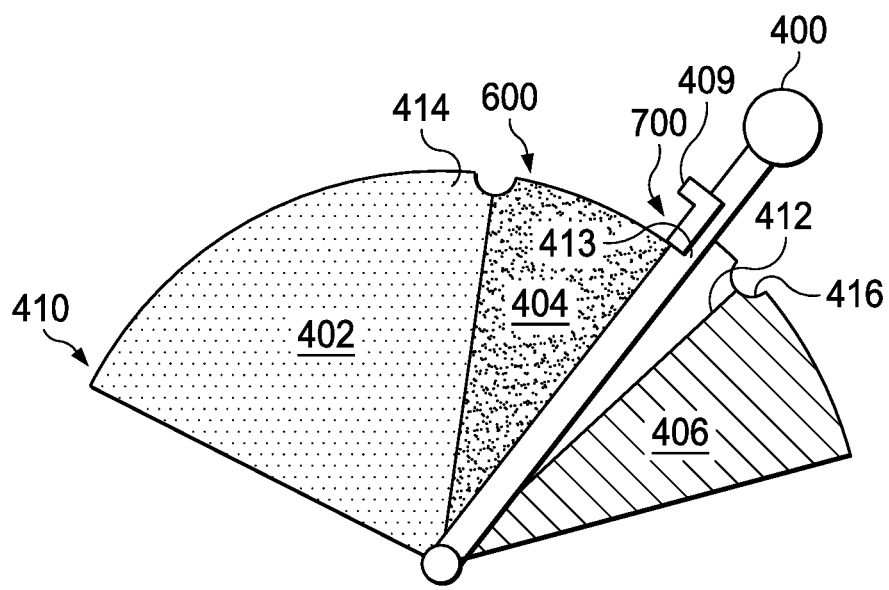
FIG. 7 is an illustration of integrated control levers within the second range of positions in accordance with an illustrative embodiment.

Turning to FIG. 7, an illustration of integrated control levers within the second range of positions is depicted in accordance with an illustrative embodiment. In this illustrative example, integrated control levers 400 are in position 700 within second range of positions 404.

As depicted, integrated control levers 400 has moved to the right of position 600. The variable drag is greater when integrated control levers 400 are in position 700 as compared to when integrated control levers 400 are in position 600.

Figure 8:
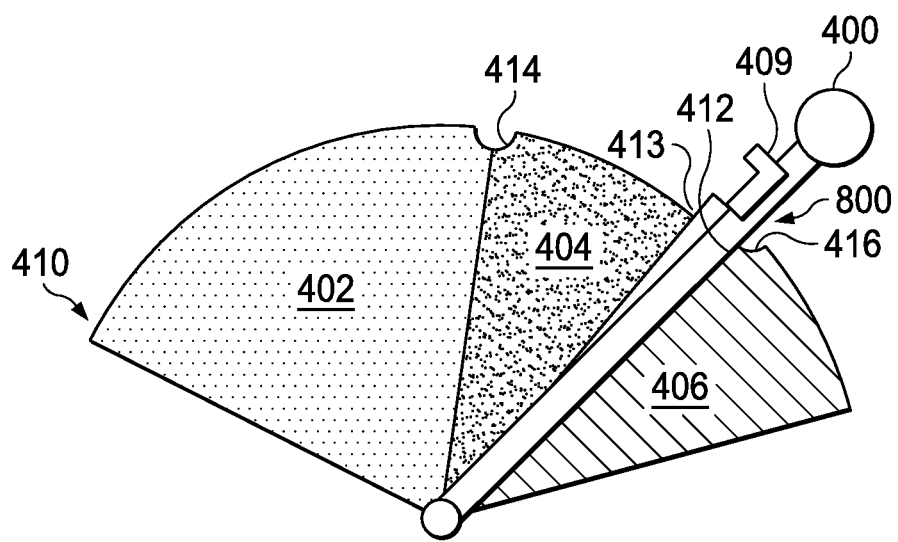
FIG. 8 is an illustration of integrated control levers within a third range of positions in accordance with an illustrative embodiment.

In FIG. 8, an illustration of integrated control levers within a third range of positions is depicted in accordance with an illustrative embodiment. In this illustrative example, the aircraft generates full drag and the reverse thrust as a variable reverse thrust without forward thrust when integrated control levers 400 is within third range of positions 406.

In this example, integrated control levers 400 are in position 800 within third range of positions 406. The variable reverse thrust is a reverse thrust that increases as integrated control levers 400 move to the right within the third range of positions 406 and decreases as integrated control levers 400 move to the left within third range of positions 406.

Figure 9:
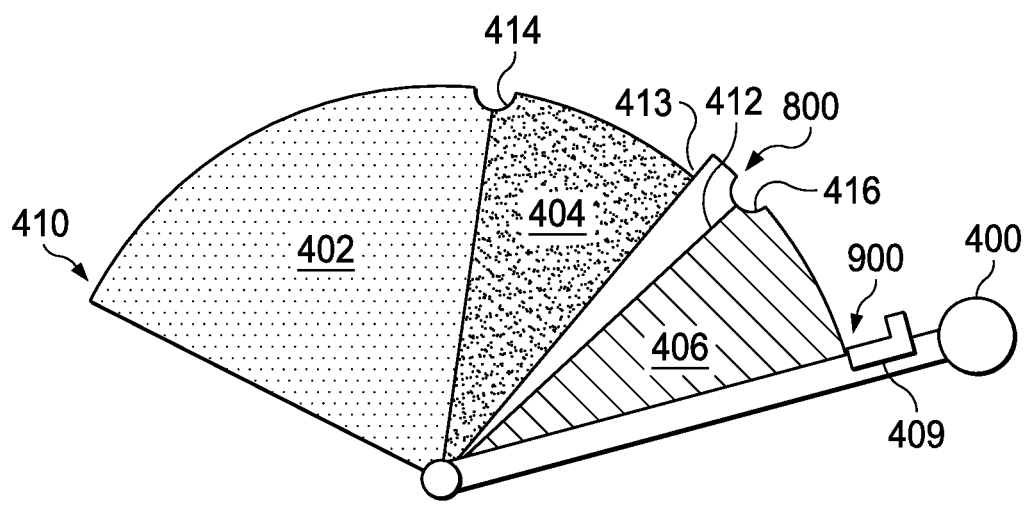
FIG. 9 is an illustration of integrated control levers within the third range of positions in accordance with an illustrative embodiment.

Turning to FIG. 9, an illustration of integrated control levers within the third range of positions is depicted in accordance with an illustrative embodiment. In this illustrative example, integrated control levers 400 are in position 900 within third range of positions 406, which is to the right of position 800. The variable reverse thrust generated by the aircraft is greater when integrated control levers 400 are in position 900 as compared to when integrated control levers 400 are in position 800.

Figure 10:
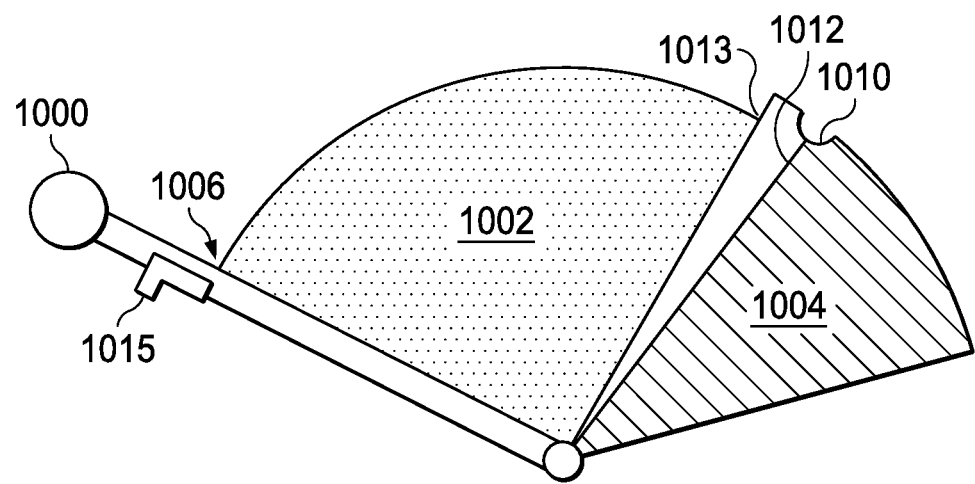
FIG. 10 is an illustration of multiple ranges of positions for integrated control levers in accordance with an illustrative embodiment.
Figure 11:
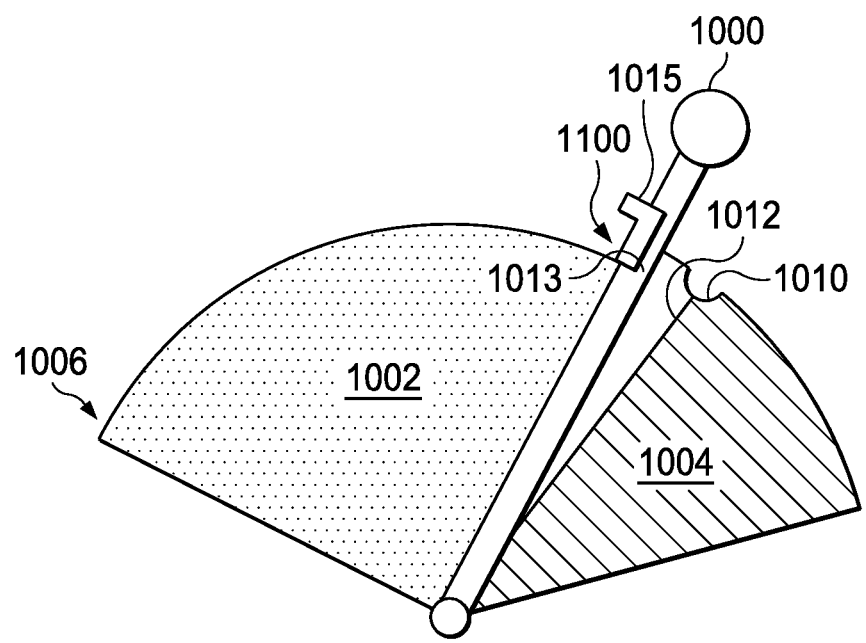
FIG. 11 is an illustration of integrated control levers within a second range of positions in accordance with an illustrative embodiment.

With reference to FIGS. 10-11, illustrations of positions for a group of integrated control levers is depicted in accordance with an illustrative embodiment. As depicted, FIGS. 10-11 show two ranges of positions that a group of integrated control levers can be placed to control movement of an aircraft.

With reference to FIG. 10, an illustration of multiple ranges of positions for integrated control levers is depicted in accordance with an illustrative embodiment. As depicted, integrated control levers 1000 are shown with respect to first range of positions 1002 and second range of positions 1004.

Integrated control levers 1000 are an example of the group of integrated control levers 224 shown in block form in FIG. 2. First range of positions 1002 and second range of positions 1004 are an example of first range of positions 236 and second range of positions 238 shown in block form in FIG. 2. In this illustrative example, second range of positions 1004 is adjacent to first range of positions 1002. As depicted, integrated control levers 1000 are in position 1006 within first range of positions 1002.

As depicted, the aircraft generates forward thrust as a variable forward thrust when integrated control levers 1000 are within the first range of positions 1002. The variable forward thrust is a forward thrust that increases as integrated control levers 1000 move to the left within first range of positions 1002 and decreases as integrated control levers move to the right within first range of positions 1002. Detent 1010 is present within second range of positions 1004.

As depicted, interlock 1012 within second range of positions 1004 and prevents integrated control levers 1000 from moving further into second range of positions 1004 unless a selected condition occurs. In this depicted example, interlock 1012 can be removed by a presence of a group of conditions selected from at least one of the aircraft on ground, reverse thrusters engaged, a selected altitude, a selected range of altitudes, a particular ground speed, a range of ground speeds, a range of air speeds, or other suitable conditions. Interlock 1012 is an electronically controlled mechanism that is controlled by a component such as movement manager 230 shown in block form in FIG. 2.

Additionally, lockout 1013 is also depicted. Lockout 1013 prevents integrated control levers 1000 from entering second range of positions 1004. Lockout 1013 can be removed by a physical action performed by the pilot such as manipulating switch 1015. When both lockout 1013 and interlock 1012 are present, both of these locking mechanisms are removed before integrated control levers 1000 can move into second range of positions 1004.

With reference next to FIG. 11, an illustration of integrated control levers within a second range of positions is depicted in accordance with an illustrative embodiment. In this example, integrated control levers 1000 are in position 1100 within second range of positions 1004.

In the illustrative example, the aircraft generates forward thrust as an idle forward thrust and drag as a variable drag without reverse thrust when integrated control levers 1000 are within the second range of positions 1004 and the aircraft is in the air. The variable drag is a drag that increases as integrated control levers 1000 move to the right within the second range of positions 1004 and decreases as integrated control levers 1000 move to the left within the second range of positions 1004 and the aircraft is in the air.

Further, the aircraft generates forward thrust as an idle forward thrust with the drag as a full drag and with variable reverse thrust when integrated control levers 1000 are within the second range of positions 1004 and the aircraft is on the ground. The variable reverse thrust is a reverse thrust that increases as integrated control levers 1000 move to the right within the second range of positions 1004 and decreases as integrated control levers 1000 move to the left within the second range of positions 1004 and the aircraft is on the ground.

Figure 12:
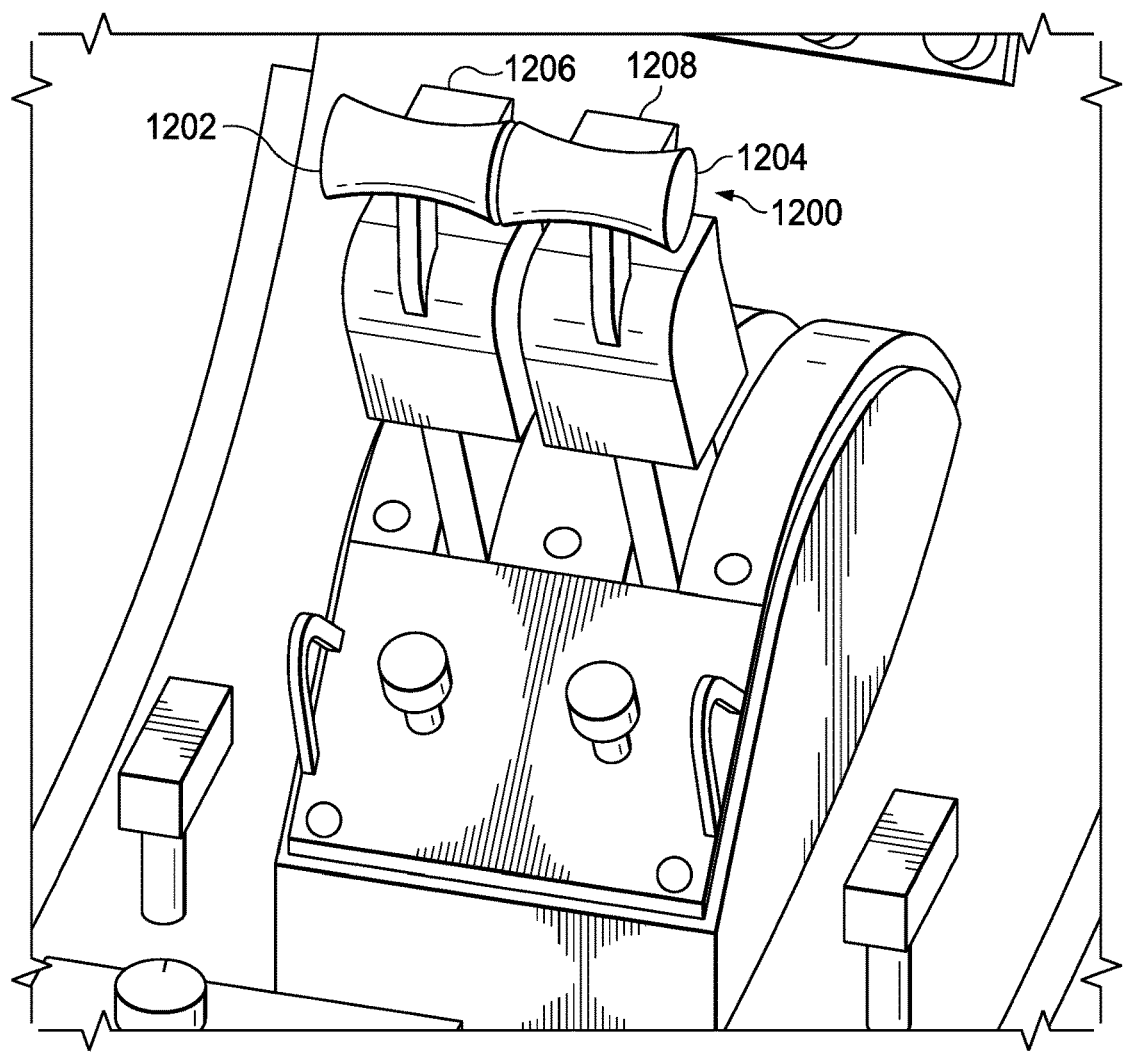
FIG. 12 is an illustration of integrated control levers in accordance with an illustrative embodiment.

With reference next to FIG. 12, an illustration of integrated control levers is depicted in accordance with an illustrative embodiment. In this illustrative example, integrated control levers 1200 is an example of one implementation for the group of integrated control levers 224 shown in block form in FIG. 2.

As depicted, the integrated control levers 1200 comprise control lever 1202 and control lever 1204. In this illustrative example, each control lever is associated with an engine installed in the aircraft. Additionally, switch 1206 is an optional component and is an example of one implementation for switch 254 shown in block form in FIG. 2 that can be manipulated by a pilot to remove a lockout.

Figure 13:
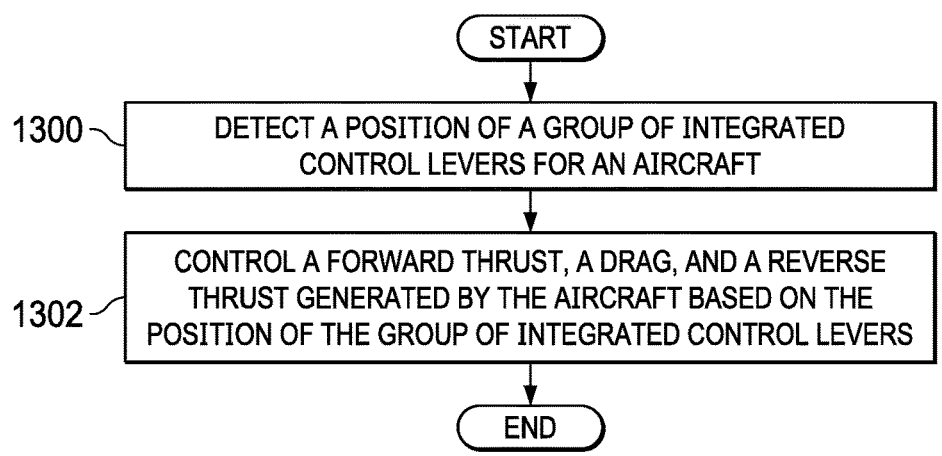
FIG. 13 is an illustration of a flowchart of a process for controlling movement of an aircraft in accordance with an illustrative embodiment.

Turning next to FIG. 13, an illustration of a flowchart of a process for controlling movement of an aircraft is depicted in accordance with an illustrative embodiment. The process in FIG. 13 can be implemented in hardware, software, or both. When implemented in software, the process can take the form of program code that is run by one or more processor units located in one or more hardware devices in one or more computer systems. For example, the process can be implemented in movement manager 230 in computer system 232 in FIG. 2.

The process begins by detecting a position of a group of integrated control levers for an aircraft (operation 1300). The process controls a forward thrust, a drag, and a reverse thrust generated by the aircraft based on the position of the group of integrated control levers (operation 1302). The process terminates thereafter.

Figure 14:
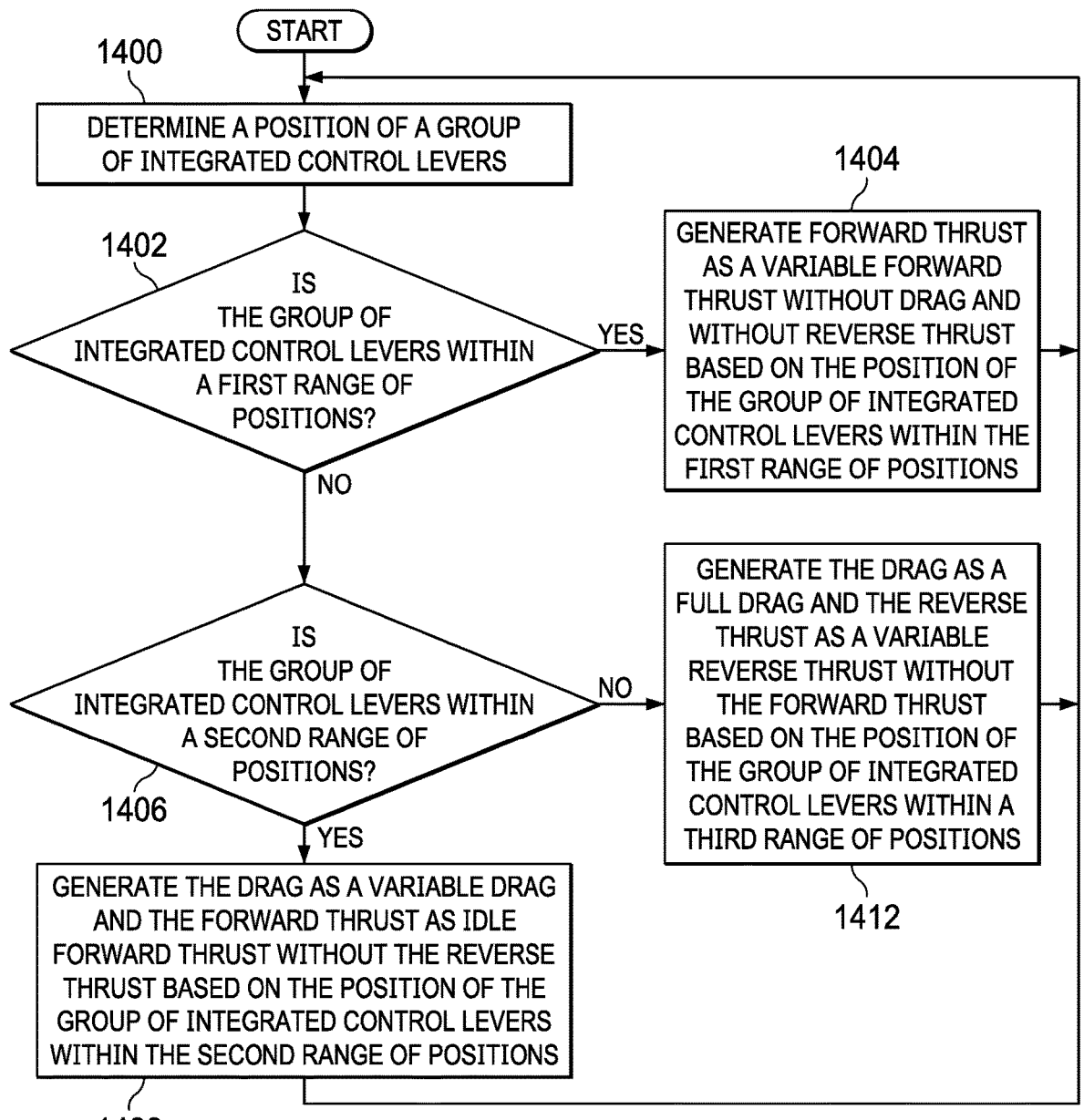
FIG. 14 is an illustration of a flowchart for controlling for the forward thrust, the drag, and the reverse thrust generated by the aircraft in accordance with an illustrative embodiment.

With reference next to FIG. 14, an illustration of a flowchart for controlling for the forward thrust, the drag, and the reverse thrust generated by the aircraft is depicted in accordance with an illustrative embodiment. The process illustrated in FIG. 14 is an example of one implementation for operation 1302 in FIG. 13.

In this example, the group of integrated control levers are movable to different positions within a first range of positions, a second range of positions adjacent to the first range of positions, and a third range of positions adjacent the second range of positions.

The process begins by determining a position of a group of integrated control levers (operation 1400). A determination is made as to whether the group of integrated control levers is within a first range of positions (operation 1402). If the group of integrated control levers is within the first range positions, the process generates forward thrust as a variable forward thrust without drag and without reverse thrust based on the position of the group of integrated control levers within the first range of positions (operation 1404). The process then returns to operation 1400.

With reference again to operation 1402, if the group of integrated levers is not within the first range of positions, a determination is made as to whether the group of integrated control levers is within a second range of positions (operation 1406). If the group of integrated levers is within the second range of positions, the process generates the drag as a variable drag and the forward thrust as idle forward thrust without the reverse thrust based on the position of the group of integrated control levers within the second range of positions (operation 1408). The process then returns to operation 1400.

With reference to operation 1406, if the group of integrated levers is not within the second range of positions, the process generates the drag as a full drag and the reverse thrust as a variable reverse thrust without the forward thrust based on the position of the group of integrated control levers within a third range of positions (operation 1412). The process then returns to operation 1400.

Figure 15:
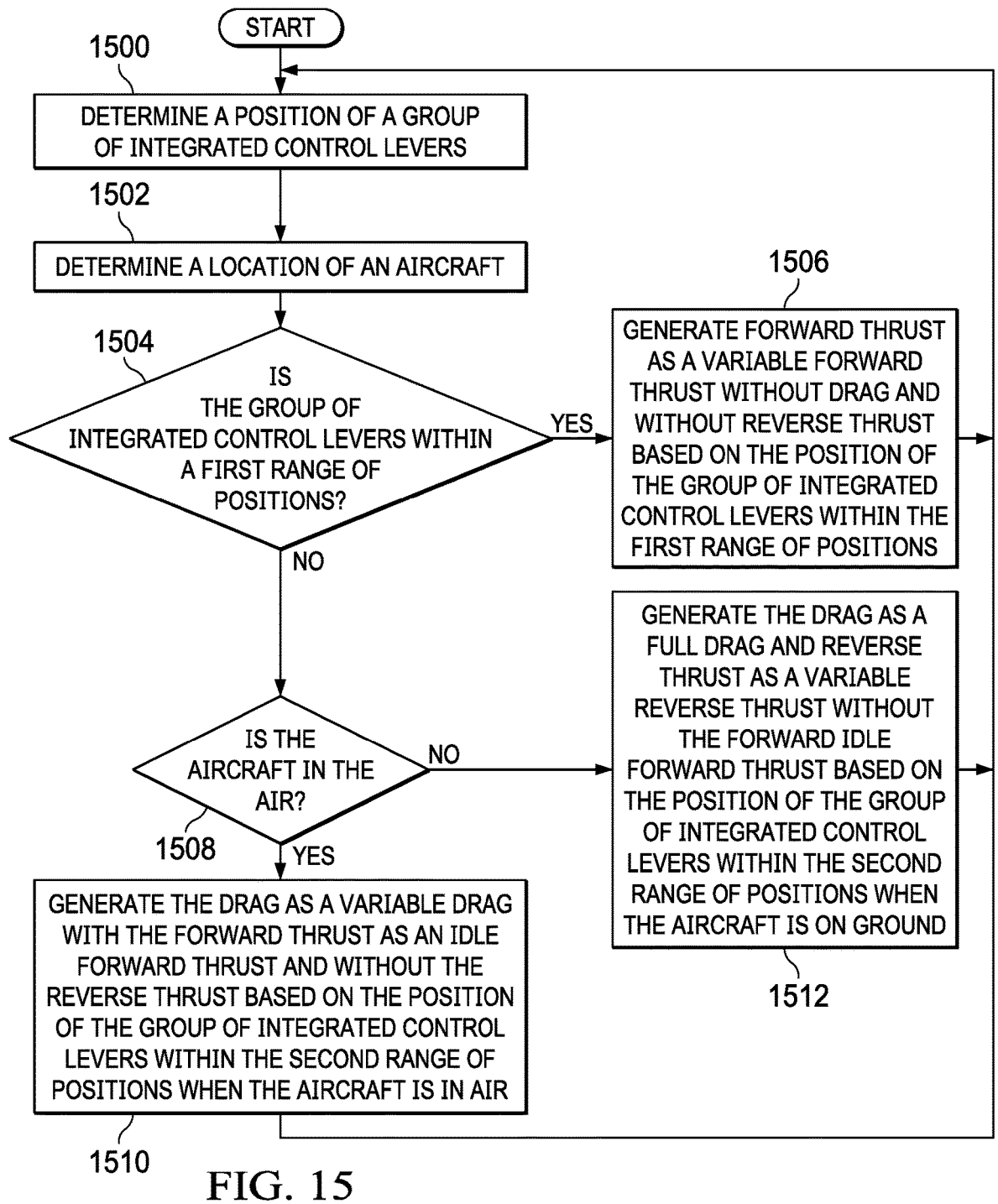
FIG. 15 is an illustration of a flowchart for controlling for the forward thrust, the drag, and the reverse thrust generated by the aircraft in accordance with an illustrative embodiment.

With reference to FIG. 15, an illustration of a flowchart for controlling for the forward thrust, the drag, and the reverse thrust generated by the aircraft is depicted in accordance with an illustrative embodiment. The process illustrated in FIG. 15 is an example of one implementation for operation 1302 in FIG. 13.

In this example, the group of the group of integrated control levers are movable to different positions within a first range of positions and a second range of positions adjacent to the first range of positions.

The process begins by determining a position of a group of integrated control levers (operation 1500). The process determines a location of an aircraft (operation 1502). In operation 1502, the location of the aircraft is in the air or on the ground.

A determination is made as to whether the group of integrated control levers is within the first range of positions (operation 1504). If the group of integrated control levers is within the first range positions, the process generates forward thrust as a variable forward thrust without drag and without reverse thrust based on the position of the group of integrated control levers within the first range of positions (operation 1506). The process then returns operation 1500.

With reference again to operation 1504, if the group of integrated control levers is not within the range of positions, the process determines whether the aircraft is in the air (operation 1508). In this case, the group of integrated control levers are in the second range of positions.

If the aircraft is in the air, process generates the drag as a variable drag with the forward thrust as an idle forward thrust and without the reverse thrust based on the position of the group of integrated control levers within the second range of positions when the aircraft is in air (operation 1510). The process then returns to operation 1500.

With reference again to operation 1508, if aircraft is not in the air, the process generates the drag as a full drag and the reverse thrust as a variable reverse thrust without the forward idle forward thrust based on the position of the group of integrated control levers within the second range of positions when the aircraft is on ground (operation 1512). The process then returns operation 1500.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 16:
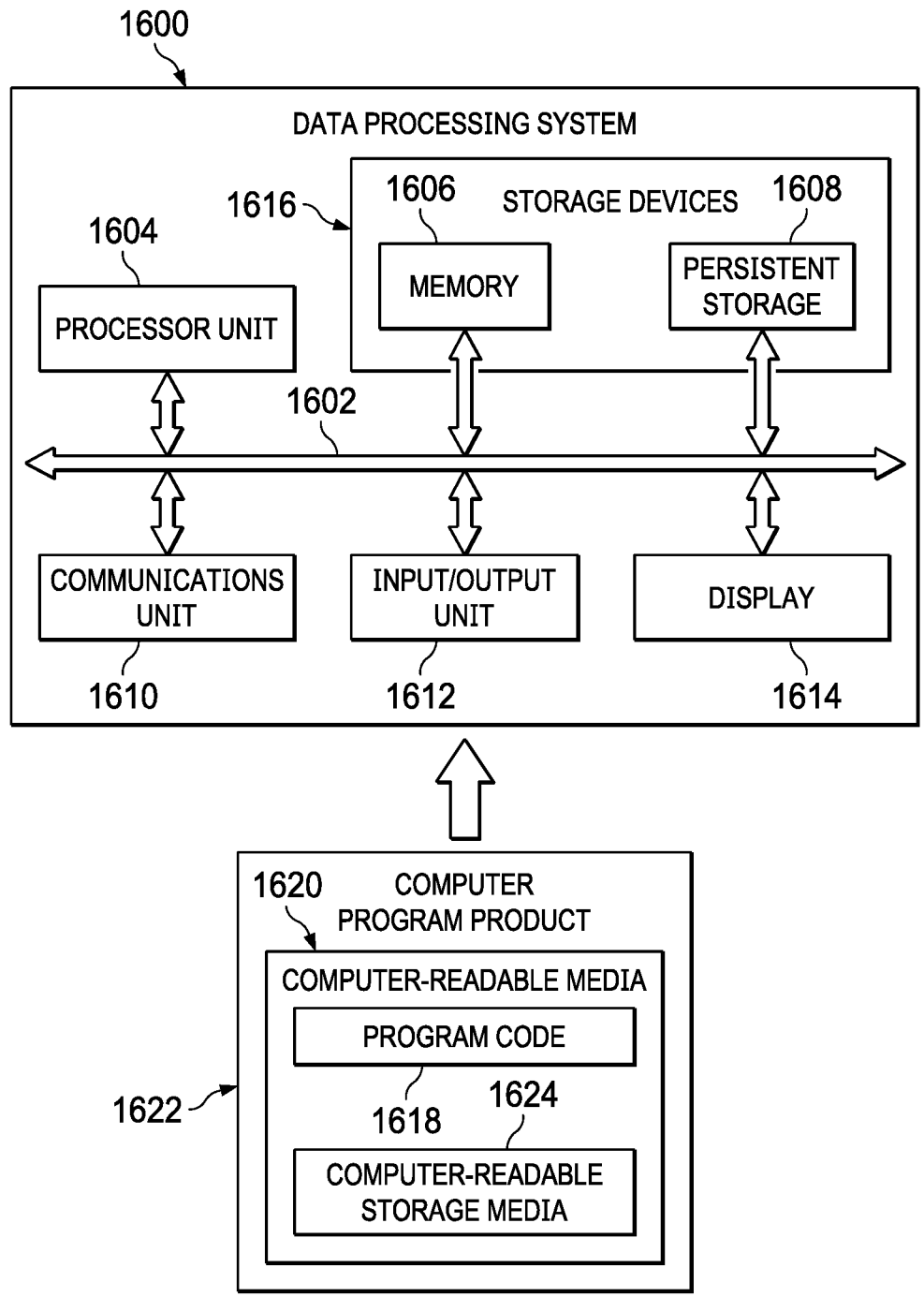
FIG. 16 is an illustration of a block diagram of a data processing system in accordance with an illustrative embodiment.

Turning now to FIG. 16, an illustration of a block diagram of a data processing system is depicted in accordance with an illustrative embodiment. Data processing system 1600 can be used to implement one or more data processing systems in computer system 232 in FIG. 2. In this illustrative example, data processing system 1600 includes communications framework 1602, which provides communications between processor unit 1604, memory 1606, persistent storage 1608, communications unit 1610, input/output (I/O) unit 1612, and display 1614. In this example, communications framework 1602 takes the form of a bus system.

Processor unit 1604 serves to execute instructions for software that can be loaded into memory 1606. Processor unit 1604 includes one or more processors. For example, processor unit 1604 can be selected from at least one of a multicore processor, a central processing unit (CPU), a graphics processing unit (GPU), a physics processing unit (PPU), a digital signal processor (DSP), a network processor, or some other suitable type of processor.

Memory 1606 and persistent storage 1608 are examples of storage devices 1616. A storage device is any piece of hardware that is capable of storing information, such as, for example, and without limitation, at least one of data, program code in functional form, or other suitable information either on a temporary basis, a permanent basis, or both on a temporary basis and a permanent basis. Storage devices 1616 may also be referred to as computer-readable storage devices in these illustrative examples. Memory 1606, in these examples, can be, for example, a random-access memory or any other suitable volatile or non-volatile storage device. Persistent storage 1608 can take various forms, depending on the particular implementation.

For example, persistent storage 1608 may contain one or more components or devices. For example, persistent storage 1608 can be a hard drive, a solid-state drive (SSD), a flash memory, a rewritable optical disk, a rewritable magnetic tape, or some combination of the above. The media used by persistent storage 1608 also can be removable. For example, a removable hard drive can be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that can be connected to data processing system 1600. For example, input/output unit 1612 can provide a connection for user input through at least one of a keyboard, a mouse, or some other suitable input device. Further, input/output unit 1612 can send output to a printer. Display 1614 provides a mechanism to display information to a user.

Instructions for at least one of the operating system, applications, or programs can be located in storage devices 1616, which are in communication with processor unit 1604 through communications framework 1602. The processes of the different embodiments can be performed by processor unit 1604 using computer-implemented instructions, which can be located in a memory, such as memory 1606. For example, process is performed by movement manager 230 in FIG. 2 and controller 308 in FIG. 3 can be implemented as instructions in program code.

These instructions are referred to as program code, computer usable program code, or computer-readable program code that can be read and executed by a processor in processor unit 1604. The program code in the different embodiments can be embodied on different physical or computer-readable storage media, such as memory 1606 or persistent storage 1608.

Program code 1618 is located in a functional form on computer-readable media 1620 that is selectively removable and can be loaded onto or transferred to data processing system 1600 for execution by processor unit 1604. Program code 1618 and computer-readable media 1620 form computer program product 1622 in these illustrative examples. In the illustrative example, computer-readable media 1620 is computer-readable storage media 1624.

In these illustrative examples, computer-readable storage media 1624 is a physical or tangible storage device used to store program code 1618 rather than a medium that propagates or transmits program code 1618.

Alternatively, program code 1618 can be transferred to data processing system 1600 using a computer-readable signal media. The computer-readable signal media can be, for example, a propagated data signal containing program code 1618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1600 are not meant to provide architectural limitations to the manner in which different embodiments can be implemented. In some illustrative examples, one or more of the components may be incorporated in or otherwise form a portion of, another component. For example, memory 1606, or portions thereof, can be incorporated in processor unit 1604 in some illustrative examples. The different illustrative embodiments can be implemented in a data processing system including components in addition to or in place of those illustrated for data processing system 1600. Other components shown in FIG. 16 can be varied from the illustrative examples shown. The different embodiments can be implemented using any hardware device or system capable of running program code 1618.

Figure 17:
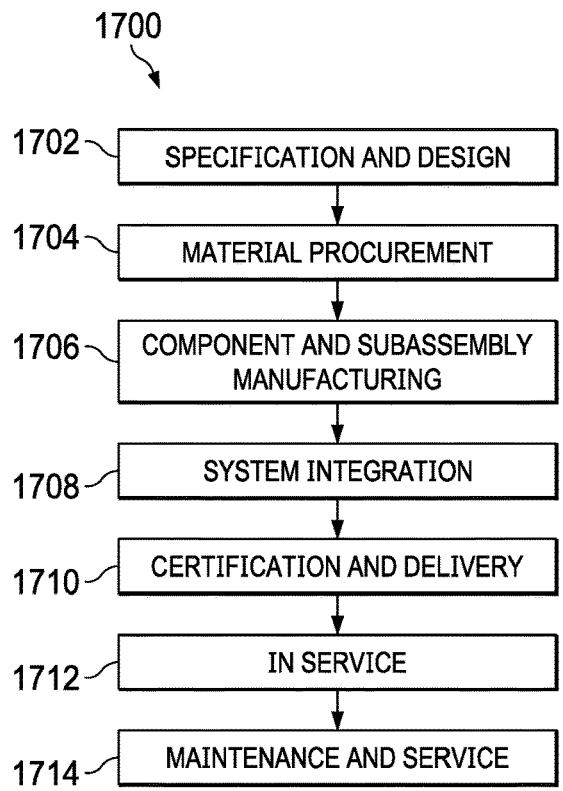
FIG. 17 is an illustration of a block diagram of an aircraft manufacturing and service method in accordance with an illustrative embodiment.
Figure 18:
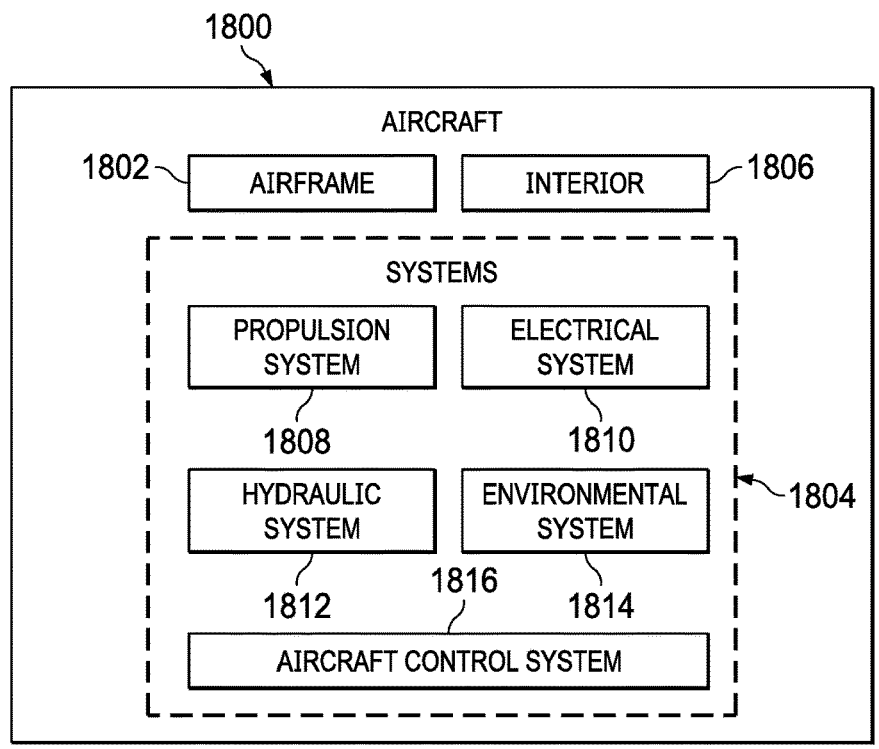
FIG. 18 is an illustration of a block diagram of an aircraft in which an illustrative embodiment may be implemented.

Illustrative embodiments of the disclosure may be described in the context of aircraft manufacturing and service method 1700 as shown in FIG. 17 and aircraft 1800 as shown in FIG. 18. Turning first to FIG. 17, an illustration of a block diagram of an aircraft manufacturing and service method is depicted in accordance with an illustrative embodiment. During pre-production, aircraft manufacturing and service method 1700 may include specification and design 1702 of aircraft 1800 in FIG. 18 and material procurement 1704.

During production, component and subassembly manufacturing 1706 and system integration 1708 of aircraft 1800 in FIG. 18 takes place. Thereafter, aircraft 1800 in FIG. 18 can go through certification and delivery 1710 in order to be placed in service 1712. While in service 1712 by a customer, aircraft 1800 in FIG. 18 is scheduled for routine maintenance and service 1714, which may include modification, reconfiguration, refurbishment, and other maintenance or service.

Each of the processes of aircraft manufacturing and service method 1700 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of a block diagram of an aircraft is depicted in which an illustrative embodiment may be implemented. In this example, aircraft 1800 is produced by aircraft manufacturing and service method 1700 in FIG. 17 and may include airframe 1802 with plurality of systems 1804 and interior 1806. Examples of systems 1804 include one or more of propulsion system 1808, electrical system 1810, hydraulic system 1812, environmental system 1814, and aircraft control system 1816. Aircraft control system 1816 can be implemented using components such as those depicted in aircraft control system 204 in FIG. 2. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1700 in FIG. 17. For example, aircraft control system 204 in FIG. 2 can be implemented in aircraft 1800 during system integration 1708. As another example, movement manager 230 in FIG. 2 can be a software aircraft part loaded into the computer system in aircraft 1800 during maintenance and service 1714. This improvement to aircraft 1800 can be performed during at least one of modification, reconfiguration, refurbishment, and other maintenance or service during maintenance and service 1714.

In one illustrative example, components or subassemblies produced in component and subassembly manufacturing 1706 in FIG. 17 can be fabricated or manufactured in a manner similar to components or subassemblies produced while aircraft 1800 is in service 1712 in FIG. 17. As yet another example, one or more apparatus embodiments, method embodiments, or a combination thereof can be utilized during production stages, such as component and subassembly manufacturing 1706 and system integration 1708 in FIG. 17. One or more apparatus embodiments, method embodiments, or a combination thereof may be utilized while aircraft 1800 is in service 1712, during maintenance and service 1714 in FIG. 17, or both. The use of a number of the different illustrative embodiments may substantially expedite the assembly of aircraft 1800, reduce the cost of aircraft 1800, or both expedite the assembly of aircraft 1800 and reduce the cost of aircraft 1800. For example, the use of an aircraft control system as described in the illustrative examples can reduce the amount of wiring, components, and other devices needed to assemble aircraft 1800. This reduction can reduce the amount of time and cost involved in manufacturing aircraft 1800.

Thus, the illustrative embodiments provide a method, apparatus, and system for controlling movement of an aircraft. One or more of the illustrative examples reduces complexity in operating aircraft. For example, or more technical solutions are present that overcome a technical problem with the increased complexity involved with multiple devices used to control the movements of an aircraft. As a result, the illustrative examples provide one or more technical solutions that result in a technical effect of reducing the complexity in performing operations to control movement of an aircraft. One or more technical solutions can provide a technical effect of reducing the complexity through combining functions currently performed using multiple control devices into a single set or group of control devices.

Thus, the amount of training needed by a pilot to operate multiple types of aircraft can be reduced through the use of aircraft control system 204 in FIG. 2 and aircraft control system 300 in FIG. 3. Further, the integrating of controls can reduce the complexity in designing and implementing aircraft control systems. This type of control system can also reduce the amount of real estate space needed in the flight deck of an aircraft for control devices.

Further, expense and weight reductions can be obtained using an aircraft control system as depicted in the different illustrative examples. For example, reduced installation time can occur. With less wire usage, a reduction in aircraft weight can also be achieved.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described.

For example, the component can have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft control system that comprises:
an engine configured to generate a forward thrust for an aircraft;
a speed brake configured to generate a drag for the aircraft;
an integrated control lever for the aircraft, wherein the integrated control lever is configured to move to different positions that comprise: a first range of positions, a second range of positions adjacent to the first range of positions, and a third range of positions adjacent the second range of positions;
an interlock at the third range of positions, wherein the interlock is configured to prevent a movement of the integrated control lever within the third range of positions when the aircraft is in air;
a thrust reverser on the engine and configured to generate a reverse thrust from the engine; and
a computer system located in the aircraft and configured to control:
the forward thrust, the drag, and the reverse thrust based on a position of the integrated control lever in the different positions; and
a removal of the interlock when the aircraft is on a ground.

2. The aircraft control system of claim 1, wherein the computer system is further configured to control:
the forward thrust as a variable forward thrust without a generation of the drag from the speed brake and the reverse thrust from the thrust reverser based on the position of the integrated control lever within the first range of positions;
the drag as a variable drag with the forward thrust as an idle forward thrust and without the reverse thrust based on the position of the integrated control lever within the second range of positions; and
the drag as a full drag and the reverser thrust as a variable reverse thrust without the forward thrust based on the position of the integrated control lever within the third range of positions.

3. The aircraft control system of claim 2 further comprising:
a lockout at the third range of positions and configured to prevent a movement of the integrated control lever into the third range of positions when the aircraft is in air; and
a switch configured to remove the lockout when the aircraft is on ground.

4. The aircraft control system of claim 2, wherein a first tactile detent is present for the second range of positions, and a second tactile detent is present for the third range of positions.

5. The aircraft control system of claim 1, wherein the computer system is further configured to control a braking friction generated by wheel brakes for the aircraft based on the position of the integrated control lever.

6. The aircraft control system of claim 5, wherein a tactile detent is located at an entrance to the second range of positions.

7. The aircraft control system of claim 1, wherein the computer system comprises a group of flight control systems that generate commands for: a group of engines, air brakes, and a number of thrust revers in the group of engines based on the position of the integrated control lever.

8. The aircraft control system of claim 1, wherein the speed brake is selected from at least one of a control surface, a spoiler, a hydraulic tail cone clamshell air brake, a deceleron, a rudder configured to vertically split, a wing leading edge device, a flap, or an air brake panel.

9. The aircraft control system of claim 1, wherein the thrust reverser is located in the engine.

10. The aircraft control system of claim 1, wherein the aircraft is selected from a group that consists of: an airplane, a jet, a passenger jet airplane, a military jet aircraft, a propeller airplane, an unmanned aerial vehicle, and a refueling tanker.

11. An aircraft control system that comprises a computer system located in an aircraft and configured to:
detect a position of an integrated control lever configured to control the following:
a forward thrust, a drag, and a reverse thrust of the aircraft based on the position of the integrated control lever; and
a movement of the integrated control lever to different positions within a first range of positions, a second range of positions adjacent to the first range of positions, and a third range of positions adjacent the second range of positions, wherein a first tactile detent is located at an entrance of the second range of positions and second tactile detent is present in the third range of positions.

12. The aircraft control system of claim 11, wherein the computer system is configured to control the aircraft to generate the following:
the forward thrust as a variable thrust without the drag and without the reverse thrust based on the position of the integrated control lever within the first range of positions;
a variable drag with the forward thrust as an idle forward thrust and the reverse thrust based on the position of the integrated control lever within the second range of positions; and
a full drag and generate the reverse thrust as a variable reverse thrust without the forward thrust based on the position of the integrated control lever within the third range of positions.

13. The aircraft control system of claim 12 further comprising an interlock located at the third range of positions and configured to:
prevent the movement of the integrated control lever within the third range of positions when the aircraft is in air; and
be removed when a group of conditions is present.

14. The aircraft control system of claim 11, wherein the computer system is configured to control the aircraft to generate the following:

the forward thrust as a variable forward thrust without the drag and without the reverse thrust based on the position of the integrated control lever within the first range of positions;

the drag as a variable drag with the forward thrust as an idle forward thrust and without the reverse thrust based on the position of the integrated control lever within the second range of positions when the aircraft is in air; and a full drag and generate the reverse thrust as a variable reverse thrust with the idle forward thrust based on the position of the integrated control lever within the second range of positions when the aircraft is on ground.

15. The aircraft control system of claim 11, further comprising:

an engine configured to respond to the computer system to generate the forward thrust; and a thrust reverser in the engine and configured to respond to the computer system to generate the reverse thrust from the engine.

16. The aircraft control system of claim 15, wherein the thrust reverser is located in the engine.

17. The aircraft control system of claim 11, further comprising:

a flight control surface system configured to respond to the computer system to generate the drag for the aircraft, wherein the flight control surface system is selected from at least one of: a control surface, a spoiler, a hydraulic tail cone clamshell air brake, a fuselage-mounted air brake, a deceleron, a rudder configured to vertically split, a wing leading edge device, a flap, or an air brake panel.

18. The aircraft control system of claim 11, wherein the aircraft is selected from a group consisting of: an airplane, a jet, a passenger jet airplane, a military jet aircraft, a propeller airplane, an unmanned aerial vehicle, and a refueling tanker.

19. The aircraft control system of claim 11, wherein the computer system is further configured to control the forward thrust, the drag, the reverse thrust, and a braking friction generated by wheel brakes for the aircraft based on the position of the integrated control lever.

20. A method for controlling a movement of an aircraft, the method comprising:

detecting, by a computer system, a position of an integrated control lever for the aircraft, wherein the integrated control lever is movable to different positions within: a first range of positions, a second range of positions adjacent to the first range of positions, and a third range of positions adjacent the second range of positions;

providing a first tactile detent for the integrated control lever for the second range of positions;

providing a second tactile detent for the integrated control lever for the third range of positions; and controlling, by the computer system, a forward thrust, a drag, and a reverse thrust generated by the aircraft based on the position of the integrated control lever.

21. The method of claim 20, wherein controlling, by the computer system, the forward thrust, the drag, and the reverse thrust generated by the aircraft based on the position of the integrated control lever comprises generating:

the forward thrust as a variable forward thrust without the drag and without the reverse thrust based on the position of the integrated control lever within the first range of positions;

the drag as a variable drag and the forward thrust as idle forward thrust without the reverse thrust based on the position of the integrated control lever within the second range of positions; and the drag as a full drag and the reverse thrust as a variable reverse thrust without the forward thrust based on the position of the integrated control lever within the third range of positions.

22. The method of claim 21 further comprising:

preventing the integrated control lever from moving into the third range of positions when the aircraft is in air with an interlock within the third range of positions; and allowing the integrated control lever to move into the third range of positions when the aircraft is on ground.

23. The method of claim 20, wherein controlling, by the computer system, the forward thrust, the drag, and the reverse thrust generated by the aircraft based on the position of the integrated control lever comprises generating:

the forward thrust as a variable forward thrust without the drag and without the reverse thrust based on the position of the integrated control lever within the first range of positions;

the drag as a variable drag with the forward thrust as an idle forward thrust and without the reverse thrust based on the position of the integrated control lever within the second range of positions when the aircraft is in air; and the drag as a full drag and the reverse thrust as a variable reverse thrust without the idle forward thrust based on the position of the integrated control lever within the second range of positions when the aircraft is on ground.

24. The method of claim 20, wherein a group of engines is controlled by the computer system for generating the forward thrust for moving the aircraft during operation of the aircraft, and a number of thrust reversers in the group of engines is controlled by the computer system to generate the reverse thrust from the group of engines during operation of the aircraft.

25. The method of claim 20, further comprising the computer system controlling a flight control surface system and generating the drag for the aircraft during operation of the aircraft.

26. The method of claim 25, wherein the flight control surface system is selected from at least one of a control surface, a spoiler, a hydraulic tail cone clamshell air brake, a fuselage-mounted air brake, a deceleron, a rudder configured to vertically split, a wing leading edge device, a flap, or an air brake panel.

27. The method of claim 20, wherein the aircraft is selected from a group consisting of an airplane, a jet, a passenger jet airplane, a military jet aircraft, a propeller airplane, an unmanned aerial vehicle, and a refueling tanker.

* * * * *